UNITED STATES PATENT OFFICE.

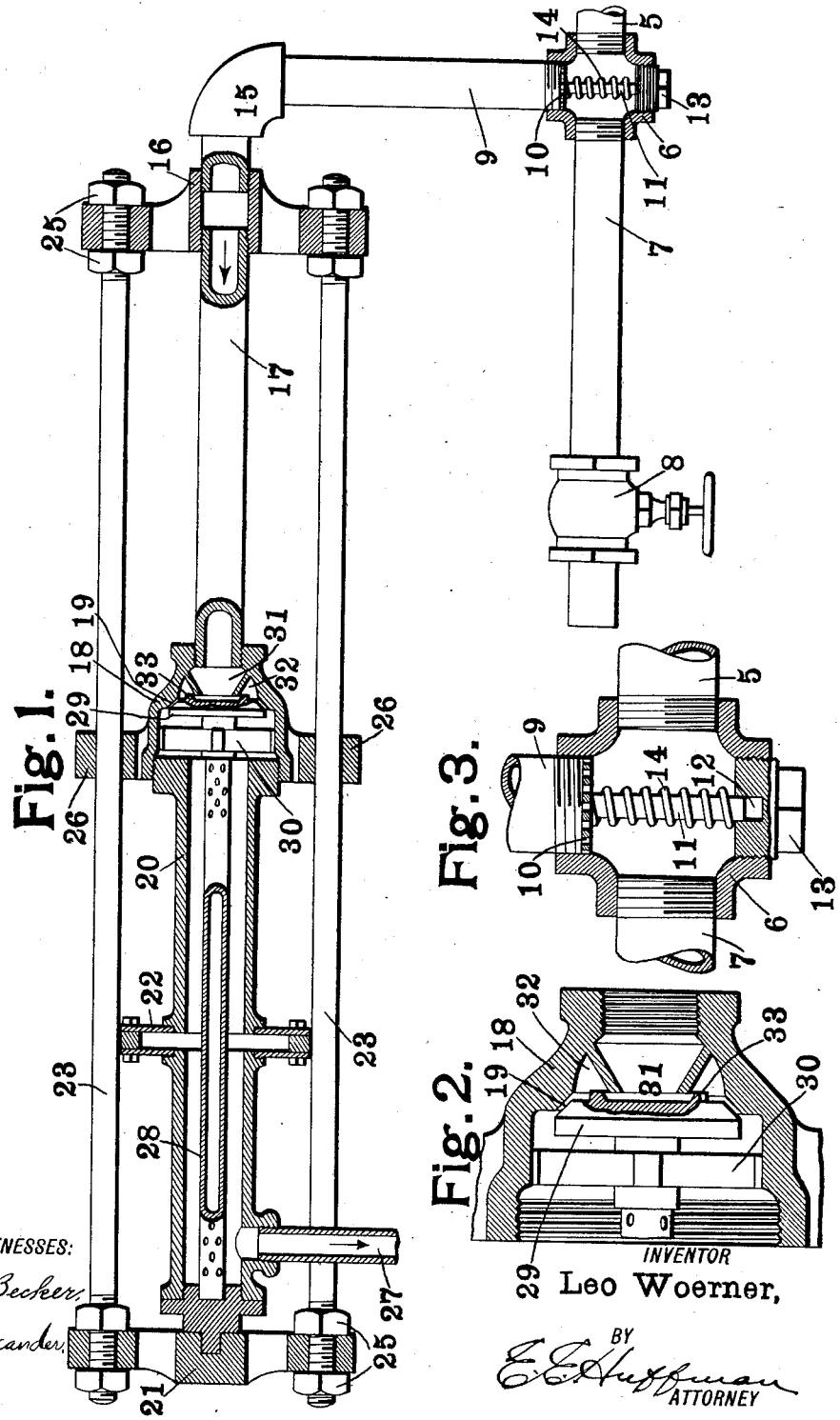

LEO WOERNER, OF ST. LOUIS, MISSOURI.

STEAM-TRAP.

1,094,108.

Specification of Letters Patent.    Patented Apr. 21, 1914.

Application filed June 28, 1913. Serial No. 776,258.

*To all whom it may concern:*

Be it known that I, LEO WOERNER, a citizen of the United States of America, residing at the city of St. Louis, State of Missouri, have invented a certain new and useful Steam-Trap, of which the following is such a full, clear, and exact description as will enable any one skilled in the art to which it appertains to make and use the same, reference being had to the accompanying drawings, forming part of this specification.

My invention relates to steam traps, and more particularly to improvements in that form of steam trap shown in my prior Patent No. 451,547, granted May 5, 1891.

The object of my invention is to so construct the valve and valve seat of a steam trap as to prevent the direct impingement of the steam on the co-acting faces thereof, and thus overcome the liability of such surfaces becoming worn.

In the accompanying drawings which illustrate one form of steam trap made in accordance with my invention, Figure 1 is a side view, partly in section, showing the complete trap; Fig. 2 is an enlarged sectional view showing the valve and valve seat; and Fig. 3 is an enlarged view showing the four-way joint.

Like marks of reference refer to similar parts in the several views of the drawings.

5 is the steam pipe leading from the steam pipes or other containers to be drained. This pipe 5 is threaded into a four-way joint 6. Opposite the pipe 5, the four-way joint 6 has secured in it a pipe 7 adapted to receive any impurities which might otherwise get into the valve and interfere with its proper operation. The impurities may be removed from the pipe 7 by opening the blow off of a cock 8 at suitable intervals. Leading from the four-way joint 6 at right angles to the pipes 5 and 7 is a pipe 9 leading to the trap proper. Bearing against the end of the pipe 9 is a perforated disk 10 forming a strainer. This disk 10 is carried on the stem 11 projecting into an opening 12 in a removable plug 13.

14 is a coil spring surrounding the stem 11 and holding the disk 10 in position. The pipe 9 is preferably provided with an elbow 15 and is connected to a T-head 16. Carried by this T-head 16 is a pipe 17 to the end of which is attached a hollow member 18 in the interior of which is formed the valve seat 19. This member 18 has secured to it one end of a two-part tube 20, the opposite end of which is carried by a T-head 21 similar to the T-head 16. The tube 20 is provided intermediate its length with an expansion joint 22. The T-heads 16 and 21 are rigidly connected by means of tie rods 23 which are secured to the said heads by nuts 25. These rods 23 also pass through lugs 26 carried on the member 18. Leading from the tube 20 is an exhaust pipe 27. Arranged within the tube 20 is a stem 28 which is preferably hollow and perforated so as to be readily expanded by the steam passing through the tube 20. Carried on the end of this stem 28 is a valve 29 which coöperates with the valve seat 19 and the member 18. The valve 29 is provided with guide means 30 causing it to properly seat. In order to protect the surfaces of the valve and valve seat from the direct action of the steam, I provide the member 18 with a conical nozzle 31 which is surrounded by an annular recess 32 and I form on the valve 29 an annular projection 33 adapted to extend a slight distance into the annular recess 32. Thus, when the steam passes through the apparatus, it will be caused to travel in a zig-zag path through the member 18 and is thus prevented from impinging directly on the wearing surfaces of the valve and valve seat.

The construction and operation of my device with the exception of the valve and valve seat are substantially the same as in my prior patent above referred to.

Having fully described my invention, what I claim as new and desire to secure by Letters-Patent of the United States is:

1. In a steam trap, the combination with a steam pipe, carrying a valve seat, of a stem carrying a valve and surrounded by an outlet passage, said valve seat being provided with a conical nozzle tapering toward its discharge end and surrounded by an annular recess, and said valve with an annular projection extending into said recess, whereby direct impingement of the steam against the co-acting valve surfaces is prevented, and stay rods connecting the outer ends of said steam pipe and stem.

2. In a steam trap, the combination with a steam pipe carrying a valve seat, of a stem carrying a valve and surrounded by an outlet passage, said valve seat having a recess within its bearing surface, and said valve having an annular projection within its bearing surface and adapted to enter said recess, whereby the fluid passing through the valve is deflected prior to its contact with the co-acting surfaces of the valve and valve seat.

3. In a steam trap, the combination with a steam pipe carrying a valve seat, of a stem carrying a valve and surrounded by an outlet passage, said valve seat having a conical contact face within which is a conical nozzle tapering toward its discharge end and surrounded by a recess, and said valve having a conical surface adapted to coöperate with said valve seat and within said surface an annular projection adapted to enter said recess, whereby the fluid passing through the device is deflected prior to reaching the co-acting surfaces of the valve and valve seat.

In testimony whereof, I have hereunto set my hand and affixed my seal in the presence of the two subscribing witnesses.

LEO WOERNER. [L. S.]

Witnesses:
W. A. ALEXANDER,
G. M. SHORR.

---

Copies of this patent may be obtained for five cents each, by addressing the "Commissioner of Patents, Washington, D. C."